(No Model.)
G. MILLEN.
WHEEL.
No. 605,112. Patented June 7, 1898.
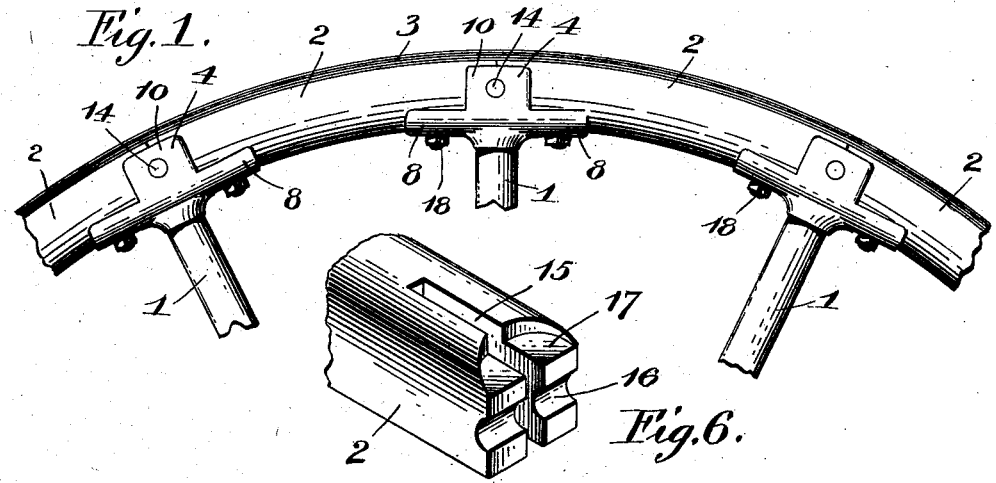
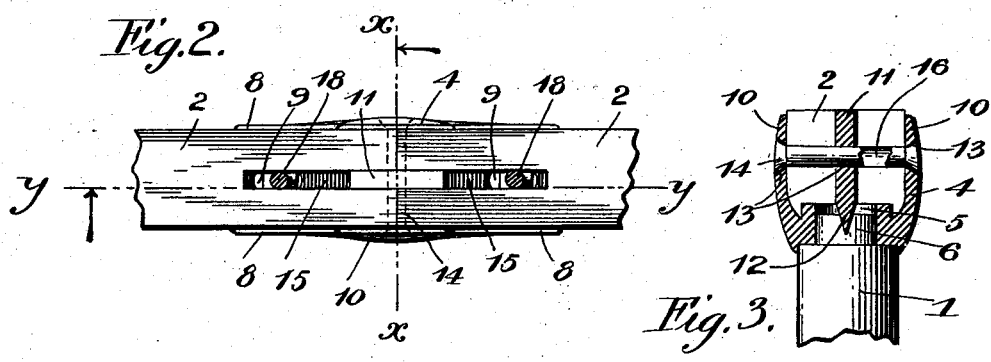
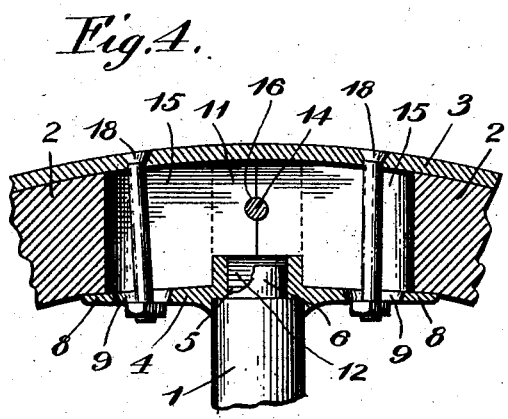
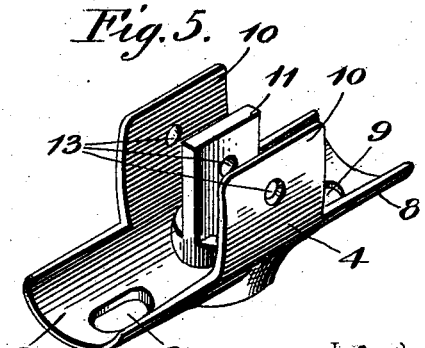
Inventor
George Millen
Witnesses
J. Frank Culverwell,
Edwin Cruse.
By his Attorneys,
C. A. Snow & Co.

UNITED STATES PATENT OFFICE.

GEORGE MILLEN, OF SAN ANTONIO, TEXAS, ASSIGNOR OF ONE-HALF TO LOUIS BERGSTROM, OF SAME PLACE.

WHEEL.

SPECIFICATION forming part of Letters Patent No. 605,112, dated June 7, 1898.

Application filed July 3, 1897. Serial No. 643,403. (No model.)

*To all whom it may concern:*

Be it known that I, GEORGE MILLEN, a citizen of the United States, residing at San Antonio, in the county of Bexar and State of Texas, have invented a new and useful Wheel, of which the following is a specification.

This invention relates to wheels, particularly to the manner of connecting the ends of the fellies and the spokes, and is especially designed for use on wheels in which the spokes are so connected to the hub that they can be forced radially outward to tighten the rim against the tire in order to avoid the necessity of shrinking the tire. When the spokes are forced outwardly, the circumference of the rim is necessarily increased, and to permit this increase in the circumference it is necessary that the several fellies shall spread apart or separate at their opposing ends.

The object of the invention is to provide a clip adapted to be firmly secured to the outer end of the spoke and to support the opposing ends of adjacent fellies in such manner that the said ends may be free to spread apart without in any manner weakening the joint.

With this and other objects in view the invention consists of the several details of construction and combination of parts hereinafter fully described, and particularly pointed out in the claims.

In the drawings, Figure 1 is an elevation of a portion of a wheel embodying my invention. Fig. 2 is a plan view, the tire being removed, showing the clip and the end of adjacent fellies being supported therein. Fig. 3 is a vertical transverse section on the line *x x* of Fig. 2. Fig. 4 is a vertical longitudinal section on the line *y y* of Fig. 2, the tire being also shown in this figure. Fig. 5 is a perspective view of the clip detached. Fig. 6 is a perspective view of an end of the felly-section.

Similar reference-numerals indicate similar parts in the several figures.

The spokes are indicated by 1, and the fellies by 2.

3 indicates the tire, and 4 the clip. The clip is provided with a socket 5 to receive the reduced end 6 of the spoke. Around this socket on the outer face of the clip a flange or shoulder is formed corresponding in outline with the outline of the body of the spoke, and this shoulder is adapted to engage the outer surface of the spoke to form an additional bearing for the latter.

8 indicates horizontally-disposed flanges which extend from opposite sides of the socket and are concavo-convex in cross-section in order to correspond with the shape of the under face of the fellies, and these flanges are to receive and support the opposing ends of adjacent fellies. Each flange is provided with an elongated opening 9, the purpose of which will be referred to hereinafter.

10 indicates vertically-extending ears on opposite sides of the socket, and these ears are adapted to engage the opposite sides of the ends of the adjacent fellies, which are supported on the flanges 8.

11 indicates a vertical plate extending diametrically across the socket 5, midway between the ears 10 and parallel therewith. This plate extends down within the socket and is provided at its lower end with a knife-edge, thereby forming a wedge 12, which will enter the end of the spoke when the latter is driven into the socket and expand the said end to hold the spoke securely in the socket. The ears 10 and plate 11 are provided with transverse alining openings (indicated by 13) for the reception of a bolt 14, which bolt serves to strengthen the clip and to hold the ears 10 firmly to the sides of the fellies.

The ends of the fellies are each provided with a vertical slot 15, extending longitudinally of the felly and of such length that when the ends of two adjacent fellies abut within the clip the inner end of the slot will be in vertical alinement with the outer end of the elongated opening 9 in the flange 8 which is directly below it. The plate 11 will seat in the said slots 15, and the end of each felly is provided with a semicircular groove 16 to receive half of the bolt 14 in order to permit the opposing ends of adjacent fellies to abut against each other. The ends of the fellies are also each provided with a semicircular recess 17 on its under side to receive half the socket 5, which projects above the surface of the flanges.

18 indicates bolts to secure the tire 3 to the rim of the wheel, and these bolts pass through the slots 15 in the ends of the fellies and the elongated openings 9 in the flanges.

From the foregoing description it will be readily seen that when the spokes are forced outwardly the fellies will be enabled to spread apart at their opposing ends, inasmuch as the bolts 18, which secure the tire in position, will offer no obstruction to such movement on account of their passing through the slots 15. This spreading apart of the ends of the fellies will never be sufficient to cause the opposing ends of the fellies to pass beyond the vertical edges of the ears 10, and the latter will therefore always hide or cover up the open space which may be between the opposing ends of the fellies, and the ends will be as firmly and securely supported whether they abut or whether they are separated some distance apart. As the spoke is immediately under the ends of the fellies they will not sink, and the wheel will consequently always maintain a true shape. The elongated openings 9 in the clip will prevent any strain on the bolts 18 should there be unequal expansion or contraction in the tire and the clip. It will also serve to prevent any strain on the bolt when the spokes are forced outwardly in order to set the rim up against the tire.

Preferably the several parts of the clip will form one integral casting; but it is obvious that the parts may be separately formed and afterward firmly united together in any suitable manner.

In Letters Patent No. 578,255, granted to me March 2, 1897, I have illustrated and described a mechanism for forcing the spokes outwardly from the hub in order to expand the rim of the wheel and tighten it against the tire, and while my present invention is especially intended for use on wheels of that character I do not intend to limit its application to such wheels, since the clip will form a very desirable means of connecting the spokes and the fellies in any vehicle-wheel.

It will be understood that changes in the form, proportion, and the minor details of construction may be resorted to without departing from the spirit or sacrificing any of the advantages of this invention.

Having thus described the invention, what I claim is—

1. In a wheel, the combination with the spokes, the tire, and the fellies provided with longitudinal vertical slots opening out at their ends and with recesses in the lower portions of their ends, of a clip having horizontally-disposed flanges to receive and support the ends of adjacent fellies, said flanges having openings to register with the slots in the fellies, a spoke-receiving socket extending above the flanges to seat in the said recesses in the ends of adjacent fellies, and a vertically-disposed plate extending across the socket to fit in the said slots in the fellies, and bolts passing through the tire, the slots in the fellies and the openings in the flanges, substantially as and for the purpose specified.

2. In a wheel, the combination with the spokes, the tire, and the fellies provided with longitudinal vertical slots opening out at their ends and with recesses in the lower portions of their ends, of a clip having horizontally-disposed flanges to receive and support the ends of adjacent fellies, said flanges having openings to register with the slots in the fellies, vertical ears extending up from the flanges to engage opposite sides of the adjacent ends of the fellies, a spoke-receiving socket extending above the flanges to seat in the said recesses in the ends of adjacent fellies, and a vertically-disposed plate extending across the socket midway between the said ears to fit in the said slots in the fellies, bolts passing through the tire, the slots in the fellies, and the openings in the flanges, and a horizontal bolt passing through the said ears, the vertical plate, and the abutting ends of the fellies, substantially as and for the purpose specified.

In testimony that I claim the foregoing as my own I have hereto affixed my signature in the presence of two witnesses.

GEORGE MILLEN.

Witnesses:
　J. W. MOORE,
　H. C. SINGER.